(12) United States Patent
Kang et al.

(10) Patent No.: US 10,636,420 B2
(45) Date of Patent: Apr. 28, 2020

(54) METHOD OF RESPONDING TO INPUT VOICE OF ELECTRONIC DEVICE AND ELECTRONIC DEVICE THEREFOR

(71) Applicant: SAMSUNG ELECTRONICS CO., LTD., Suwon-si, Gyeonggi-do (KR)

(72) Inventors: Shin-Jae Kang, Suwon-si (KR); Jeong-Hyun Ha, Hwaseong-si (KR); Seok-Yeong Jung, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 113 days.

(21) Appl. No.: 15/850,081

(22) Filed: Dec. 21, 2017

(65) Prior Publication Data

US 2018/0197539 A1 Jul. 12, 2018

(30) Foreign Application Priority Data

Jan. 9, 2017 (KR) ........................ 10-2017-0002830

(51) Int. Cl.
| | |
|---|---|
| *G10L 15/22* | (2006.01) |
| *G10L 15/18* | (2013.01) |
| *G10L 17/00* | (2013.01) |
| *G10L 17/06* | (2013.01) |
| *G10L 17/04* | (2013.01) |
| *G10L 15/30* | (2013.01) |
| *G10L 17/02* | (2013.01) |

(52) U.S. Cl.
CPC .......... *G10L 15/22* (2013.01); *G10L 15/1815* (2013.01); *G10L 17/005* (2013.01); *G10L 17/02* (2013.01); *G10L 17/06* (2013.01); *G10L 15/30* (2013.01); *G10L 17/04* (2013.01); *G10L 2015/223* (2013.01)

(58) Field of Classification Search
CPC ... G10L 15/22; G10L 15/1815; G10L 17/005; G10L 17/02; G10L 17/06; G10L 15/30; G10L 17/04; G10L 2015/223
See application file for complete search history.

(56) References Cited

U.S. PATENT DOCUMENTS 9,117,449 B2 8/2015 Newman et al.
9,147,399 B1 * 9/2015 Hart ..................... G10L 17/08
(Continued)

FOREIGN PATENT DOCUMENTS

JP 4968663 7/2012
KR 10-2013-0133629 12/2013

OTHER PUBLICATIONS

Dehak et al. "Front-End Factor Analysis for Speaker Verification", IEEE Transactions on Audio, Speech, and Language Processing, vol. 19, No. 4, May 2011, pp. 788-798.
(Continued)

*Primary Examiner* — Sonia L Gay
(74) *Attorney, Agent, or Firm* — Nixon & Vanderhye P.C.

(57) ABSTRACT

Disclosed is an electronic device including: at least one processor; and a memory electrically connected to the at least one processor, wherein the memory stores instructions to recognize a received first voice, recognizes a first speaker based on the recognized first voice, and determines a response corresponding to the first voice based on a result of the recognition of the first speaker. Other embodiments are possible.

16 Claims, 10 Drawing Sheets

(56) References Cited

U.S. PATENT DOCUMENTS

| | | | |
|---|---|---|---|
| 2006/0020473 A1* | 1/2006 | Hiroe | G10L 13/027 704/275 |
| 2013/0325484 A1 | 12/2013 | Chakladar et al. | |
| 2013/0339018 A1* | 12/2013 | Scheffer | G10L 17/22 704/236 |
| 2014/0358535 A1 | 12/2014 | Lee et al. | |
| 2016/0092160 A1* | 3/2016 | Graff | G01C 21/3641 704/257 |
| 2016/0098996 A1* | 4/2016 | Ding | G10L 17/22 704/232 |

OTHER PUBLICATIONS

Kenny et al. "Deep Neural Networks for extracting Baum-Welch statistics for Speaker Recognition", in Proc. IEEE Odyssey, 2014, pp. 293-298.

Lei et al. "A Novel Scheme for Speaker Recognition Using a Phonetically-Aware Deep Neural Network", in Proc. ICASSP, 2014, 4 pages.

Richardson et al. "Deep Neural Network Approaches to Speaker and Language Recognition", IEEE Signal Processing Letters, vol. 22, No. 10, Oct. 2015, pp. 1671-1675.

Sadjadi et al. "The IBM 2016 Speaker Recognition System", 7 pages.

Snyder et al. "Time Delay Deep Neural Network-Based Universal Background Models for Speaker Recognition", in Proc IEEE ASRU, Scottsdale, AZ, Dec. 2015, 6 pages.

McLAREN et al. "Advances in Deep Neural Network Approaches to Speaker Recognition", 5 pages.

Richardson et al. "A Unified Deep Neural Network for Speaker and Language Recognition", Interspeech 2015, 5 pages.

Wang et al. "DNN-based Discriminative Scoring for Speaker Recognition Based on i-vector" CSLT Technical Report-20150002, Jan. 10, 2015, pp. 1-19.

* cited by examiner

METHOD OF RESPONDING TO INPUT VOICE OF ELECTRONIC DEVICE AND ELECTRONIC DEVICE THEREFOR

CROSS-REFERENCE TO RELATED APPLICATION

This application is based on and claims priority under 35 U.S.C. § 119 to Korean Application Serial No. 10-2017-0002830, which was filed in the Korean Intellectual Property Office on Jan. 9, 2017, the entire content of which is hereby incorporated herein by reference.

FIELD

The present disclosure relates to a method of responding to an input voice of an electronic device and/or an electronic device—therefor.

BACKGROUND

Conventional electronic devices, such as smart phones and tablet PCs, may control various functions thereof in response to a user's voice recognized through voice recognition technology. For example, electronic devices may conveniently execute various functions, such as making a phone call, sending a message, finding a route, searching the Internet, and setting an alarm, in response to a recognized user's voice command.

SUMMARY

In order to use a voice recognition function, an electronic device utilizes an operation for activating the voice recognition function. A method of activating the electronic device uses an input via a separate hardware key included in the electronic device, a user input for executing a particular application, and/or a voice input via a separate wakeup keyword. Repeated additional input should be made when the user utters a voice command.

Speaker verification technology may be used to reduce additional user input for activating voice recognition. The speaker verification technology performs an operation for recognizing a voice when a speaker is a registered speaker based at least on a speaker verification result, and performs an operation in a standby state when the speaker is not a registered speaker so as to easily perform voice recognition without any control by the user.

However, in terms of individualization, the conventional technology is limited to recognizing a particular learned speaker, and thus the electronic device simply provides limited service of an artificial intelligence system. Further, the technology may have difference in a speaker recognition rate according to the speaker verification performance, thereby leading to errors in speaker recognition. Even though the user is registered, the user may repeatedly fail to be recognized. In voice recognition technology combined with speaker verification technology, a model, which has been learned, may have difficulty adapting to varying actual environment data.

According to various example embodiments, it is possible to provide a method of responding to an input voice by an electronic device and/or an electronic device therefor based on speaker recognition specialized for individualization.

According to various example embodiments, it is possible to provide a method and/or an electronic device updating a model by securing data through continuous use of a response function for a voice input into the electronic device.

In accordance with an example aspect of the present disclosure, an electronic device is provided. The electronic device includes: at least one processor; and a memory electrically connected to the at least one processor, wherein the memory stores instructions to recognize a received first voice, recognizes a first speaker based on the recognized first voice, and determines a response corresponding to the first voice based on the result of recognition of the first speaker.

In accordance with another example aspect of the present disclosure, a method of responding to an input voice by an electronic device is provided. The method includes: recognizing a received first voice; recognizing a first speaker based on the recognized first voice; and determining a response corresponding to the first voice based on a result of the recognition of the first speaker.

In accordance with another example aspect of the present disclosure, a machine-readable storage medium recording a program to perform a method of responding to an input voice by an electronic device is provided. The method includes: recognizing a received first voice; recognizing a first speaker based on the recognized first voice; and determining a response corresponding to the first voice based on a result of the recognition of the first speaker.

A method of responding to an input voice by an electronic device and an electronic device therefor according to various example embodiments may provide a recognized speaker-based customized response to expand the usability of a function of responding to voice input into the electronic device and enables expansion of artificial intelligence services such as voice recognition. Further, the method and the electronic device may play an important role in increasing the variety and popularity of artificial intelligence services in electronic devices, for example, smart phones and/or Internet of Things (IoT)-based devices, by providing a customized response to each speaker.

According to various example embodiments, when a speaker is not a registered speaker, the method and the electronic device may be used as technology for reducing a user's negative experience and compensating for development algorithm performance by providing various responses. Further, it is possible to implement a system that is more adaptable to actual environment data by updating models by securing data through the continuous use of a function for responding to a voice input into the electronic device. When various speakers are registered, it is possible to implement a customized service through an individual-specific response.

According to various example embodiments, when the electronic device is a server, the electronic device may provide a variety of services based on links with various other devices.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
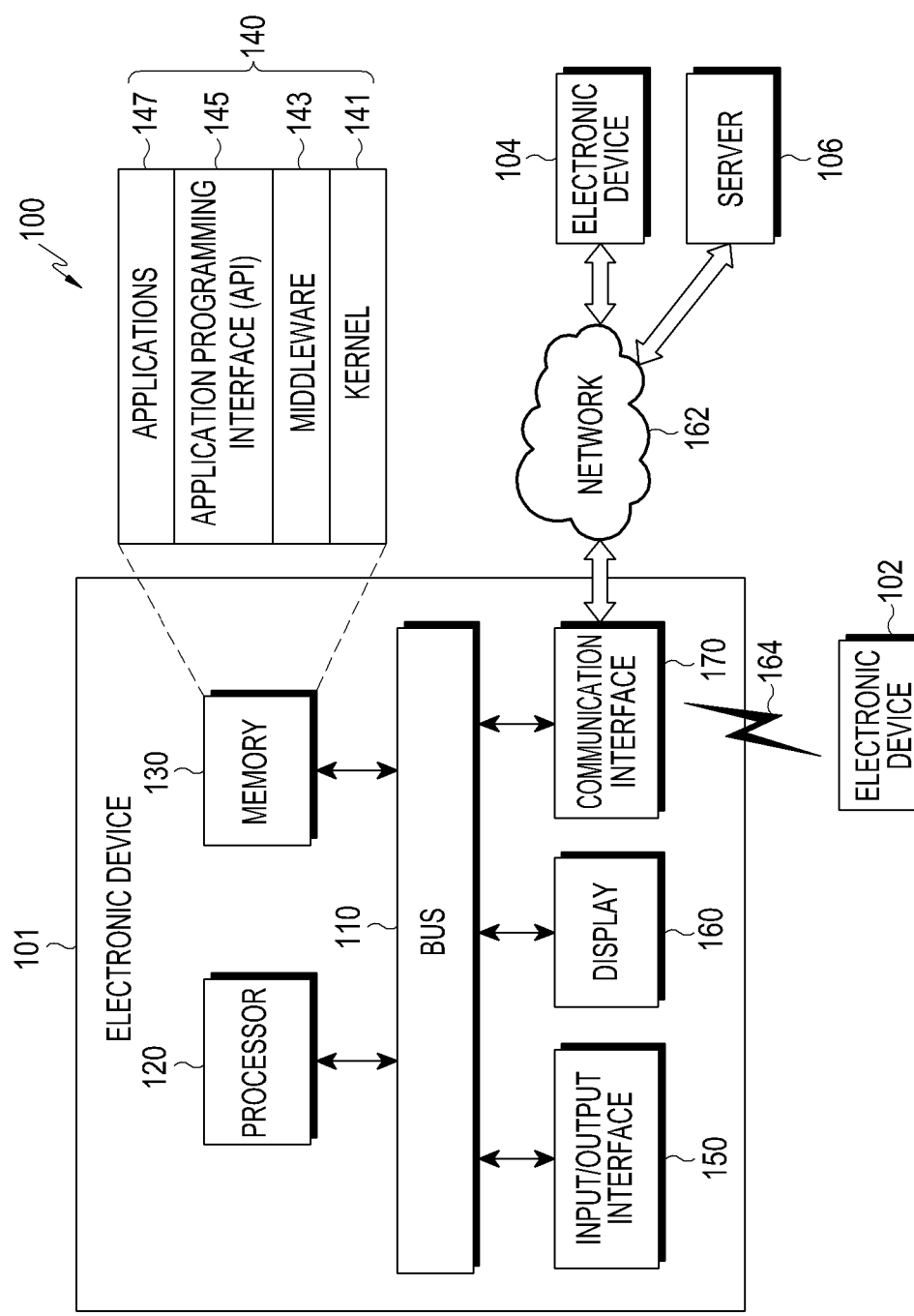
FIG. 1 illustrates a network environment including electronic devices according to various example embodiments.

Hereinafter, various example embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals are used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various example embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some example embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other example embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some example embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various example embodiments, the electronic device may be flexible, or may be a combination of one or more of the aforementioned various devices. The electronic device according to one example embodiment of the present disclosure is not limited to the above described devices. In the present disclosure, the term "user" may indicate a person using an electronic device or a device (e.g., an artificial intelligence electronic device) using an electronic device.

An electronic device 101 within a network environment 100, according to various example embodiments, will be described with reference to FIG. 1. The electronic device 101 may include a bus 110, a processor (including processing circuitry) 120, a memory 130, an input/output interface (including interface circuitry) 150, a display 160, and a communication circuit 170. In some example embodiments, the electronic device 101 may omit at least one of the elements, or may further include other elements. The bus 110 may include a circuit that interconnects the elements 110 to 170 and transfers communication (for example, control messages and/or data) between the elements. The processor 120 may include one or more of a central processing unit, an application processor, and a communication processor (CP). The processor 120, for example, may carry out operations or data processing relating to the control and/or communication of at least one other element of the electronic device 101.

The memory 130 may include volatile and/or non-volatile memory. The memory 130 may store, for example, instructions or data relevant to at least one other element of the electronic device 101. According to an example embodiment, the memory 130 may store software and/or a program 140. The program 140 may include a kernel 141, middleware 143, an Application Programming Interface (API) 145, and/or applications (or "apps") 147. At least some of the kernel 141, the middleware 143, and the API 145 may be referred to as an operating system. The kernel 141 may control or manage, for example, system resources (for example, the bus 110, the processor 120, and the memory 130) which are used to execute an operation or a function implemented in the other programs (for example, the middleware 143, the API 145, and the applications 147). Furthermore, the kernel 141 may provide an interface through which the middleware 143, the API 145, or the applications 147 may access the individual elements of the electronic device 101 to control or manage system resources.

The middleware 143 may function as, for example, an intermediary for allowing the API 145 or the applications 147 to communicate with the kernel 141 to exchange data. Furthermore, the middleware 143 may process one or more task requests, which are received from the applications 147, according to priorities thereof. For example, the middleware 143 may assign priorities for using system resources (for example, the bus 110, the processor 120, the memory 130, or the like) of the electronic device 101 to one or more of the applications 147, and may process the one or more task requests. The API 145 is an interface through which the applications 147 control functions provided from the kernel 141 or the middleware 143, and may include, for example, at least one interface or function (for example, instruction) for file control, window control, image processing, or text control. For example, the input/output interface 150 may forward instructions or data, input from a user or an external device, to the other element(s) of the electronic device 101, or may output instructions or data, received from the other element(s) of the electronic device 101, to the user or the external device.

The display 160 may include, for example, a Liquid Crystal Display (LCD), a Light-Emitting Diode (LED) display, an Organic Light-Emitting Diode (OLED) display, a Micro Electro Mechanical System (MEMS) display, or an electronic paper display. The display 160 may display, for example, various types of content (e.g., text, images, videos, icons, and/or symbols) for a user. The display 160 may include a touch screen and may receive, for example, a touch, gesture, proximity, or hovering input using an electronic pen or the user's body part. The communication interface 170, for example, may set communication between the electronic device 101 and an external device (e.g., a first external electronic device 102, a second external electronic device 104, or a server 106). For example, the communication interface 170 may be connected to a network 162 through wireless or wired communication to communicate with the external device (for example, the second external electronic device 104 or the server 106) and may communicate with electronic device 102 wirelessly 164.

The wireless communication may include, for example, at least one of Long Term Evolution (LTE), LTE-Advanced (LTE-A), Code Division Multiple Access (CDMA), Wideband CDMA (WCDMA), Universal Mobile Telecommunications System (UMTS), WiBro (Wireless Broadband), Global System for Mobile Communications (GSM), and the like. According to an example embodiment, the wireless communication may include, for example, at least one of Wi-Fi, Bluetooth, Bluetooth low energy (BLE), ZigBee, near field communication (NFC), magnetic secure transmission, radio frequency, and body area network (BAN). According to an example embodiment, the wired communication may include GNSS. The GNSS may be, for example, a global positioning system (GPS), a global navigation satellite system (GLONASS), a BeiDou navigation satellite system (hereinafter, referred to as "BeiDou"), or Galileo (the European global satellite-based navigation system). Hereinafter, in this document, the term "GPS" may be interchangeable with the term "GNSS". The wired communication may include, for example, at least one of a Universal Serial Bus (USB), a High-Definition Multimedia Interface (HDMI), Recommended Standard 232 (RS-232), a Plain Old Telephone Service (POTS), and the like. The network 162 may include at least one of a telecommunication network, such as a computer network (for example, a LAN or a WAN), the Internet, and a telephone network.

Each of the first and second external electronic devices 102 and 104 may be of the same or a different type from the electronic device 101. According to various example embodiments, all or some of the operations performed in the electronic device 101 may be performed in another electronic device or a plurality of electronic devices (for example, the electronic devices 102 and 104 or the server 106). According to an example embodiment, when the electronic device 101 has to perform a function or service automatically or in response to a request, the electronic device 101 may request another device (for example, the electronic device 102 or 104, or the server 106) to perform at least some functions relating thereto, instead of autonomously or additionally performing the function or service. Another electronic device (for example, the electronic device 102 or 104, or the server 106) may execute the requested functions or the additional functions, and may deliver information about the result of execution thereof to the electronic device 101. The electronic device 101 may provide the received result as it is, or may additionally process the received result and provide the requested functions or services. To achieve this, for example, cloud-computing, distributed-computing, or client-server-computing technology may be used.

Figure 2:
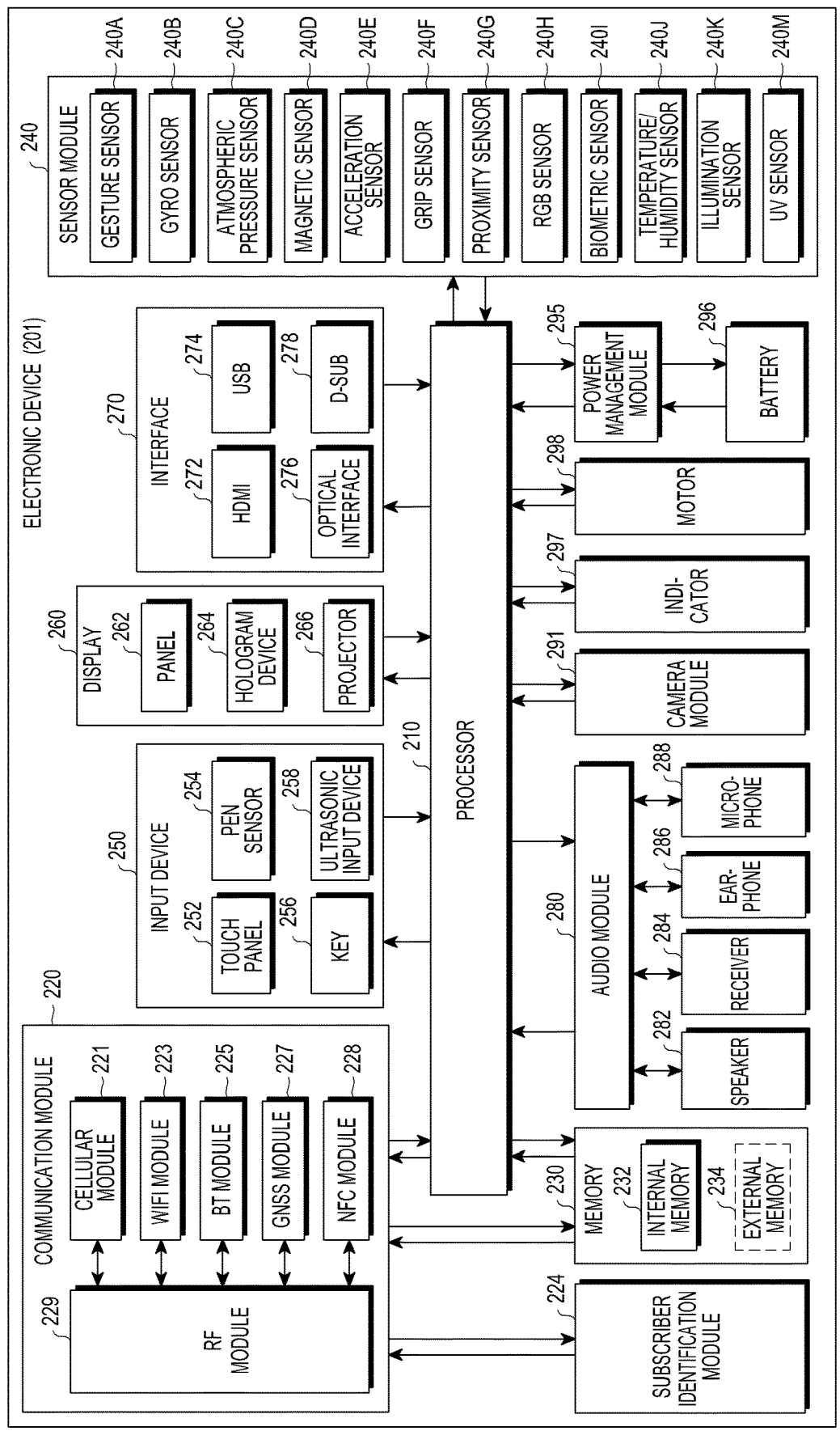
FIG. 2 is a block diagram illustrating an electronic device according to various embodiments.

FIG. 2 is a block diagram illustrating an electronic device 201 (or 101) according to various example embodiments. The electronic device 201 may include, for example, all or part of the electronic device 101 illustrated in FIG. 1. The electronic device 201 may include at least one processor 210 (for example, an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298, each of which may include circuitry for performing the respective functions. The processor 210, which may include processing circuitry, may control a plurality of hardware or software elements connected thereto and may perform various data processing and operations by driving an operating system or an application. The processor 210A may be implemented by, for example, a System on Chip (SoC). According to an example embodiment, the processor 210 may further include a graphic processing unit (GPU) and/or an image signal processor. The processor 210 may also include at least some of the other elements illustrated in FIG. 2 (for example, a cellular module 221). The processor 210 may load, in volatile memory, instructions or data received from at least one of the other elements (for example, non-volatile memory), process the loaded instructions or data, and store the result data in the non-volatile memory.

The communication module 220 may have a configuration that is the same as, or similar to, that of the communication interface 170 of FIG. 1. The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. According to an example embodiment of the present disclosure, the cellular module 221 may identify or authenticate an electronic device 201 in the communication network using a subscriber identification module (for example, a Subscriber Identity Module (SIM) card) 224. According to an example embodiment, the cellular module 221 may perform at least some of the functions that the AP 210 may provide. According to an example embodiment, the cellular module 221 may include a communication processor (CP), including processing circuitry. In some example embodiments, at least some (two or more) of the cellular module 221, the Wi-Fi module 223, the Bluetooth module 225, the GNSS module 227, and the NFC module 228 may be included in a single Integrated Chip (IC) or IC package. The RF module 229 may transmit/receive, for example, a communication signal (for example, an RF signal). The RF module 229 may include, for example, a transceiver, a power amp module (PAM), a frequency filter, a low-noise amplifier (LNA), an antenna, or the like. According to another example embodiment, at least one of the cellular module 221, the Wi-Fi module 223, the BT module 225, the GNSS module 227, and the NFC module 228 may transmit/receive an RF signal through a separate RF module. The subscriber identification module 224 may include, for example, a card that includes a subscriber identification module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, internal memory 232 or external memory 234. The internal memory 232 may include, for example, at least one of volatile memory (for example, a DRAM, an SRAM, an SDRAM, or the like) and non-volatile memory (for example, a one-time programmable ROM (OTPROM), a PROM, an EPROM, an EEPROM, a mask ROM, a flash ROM, a flash memory, a hard disc drive, or a solid-state drive (SSD)). The external memory 234 may include a flash drive, for example, a compact flash (CF), a secure digital (SD), a Micro-SD, a Mini-SD, an eXtreme digital (xD), a multi-media card (MMC), a memory stick, and the like. The external memory 234 may be functionally and/or physically connected to the electronic device 201 through any of various interfaces.

The sensor module 240 may, for example, measure a physical quantity or detect the state of operation of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and an ultraviolet (UV) sensor 240M, each of which may include circuitry for performing the respective functions. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some example embodiments, the electronic device 201 may further include a processor, which is configured to control the sensor module 240, as a part of the processor 210 or separately from the processor 210 in order to control the sensor module 240 while the processor 210 is in a sleep state.

The input device 250, including input circuitry, may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer to provide a tactile reaction to a user. The (digital) pen sensor 254 may include, for example, a recognition sheet, which is the part of the touch panel or is separated from the touch panel. The key 256 may include, for example, a physical button, keyboard, an optical key, or a keypad. The ultrasonic input device 258 may detect ultrasonic waves, which are generated by an input tool, through a microphone (for example, a microphone 288) and may identify data corresponding to the detected ultrasonic waves.

The display 260 (for example, the display 160) may include a display panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an example embodiment, the panel 262 may include a pressure sensor (or a POS sensor) which may measure the strength of pressure of a user's touch. The pressure sensor may be implemented so as to be integrated with the touch panel 252, or may be implemented as one or more sensors separate from the touch panel 252. The hologram device 264 may show a three dimensional image in the air using light interference. The projector 266 may display an image by projecting light onto a screen. The screen may be located, for example, in the interior of, or on the exterior of, the electronic device 201. The interface 270, including interface circuitry, may include, for example, an HDMI 272, a USB 274, an optical interface 276, or a D-subminiature (D-sub) interface 278. The interface 270 may be included in, for example, the communication circuit 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) standard interface.

The audio module 280 may convert, for example, sound into an electrical signal, and/or vice versa. At least some elements of the audio module 280 may be included, for example, in the input/output interface 150 illustrated in FIG. 1. The audio module 280 may process sound information that is input and/or output through, for example, a speaker device 282, a receiver 284, earphones 286, the microphone 288, and the like. The camera module 291 is a device that can photograph a still image and a moving image. According to an example embodiment, the camera module 291 may include one or more image sensors (for example, a front sensor or a rear sensor), a lens, an image signal processor (ISP), or a flash (for example, an LED or xenon lamp). The power management module 295 may manage, for example, the power of the electronic device 201. According to an example embodiment, the power management module 295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, a remaining charge of the battery 296, and a voltage, a current, or a temperature while charging. The battery 296 may include, for example, a rechargeable battery or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, or the like. The electronic device 201 may include a mobile TV support device (for example, a GPU) that can process media data according to a standard, such as digital multimedia broadcasting (DMB), digital video broadcasting (DVB), mediaFlo™, and the like. Each of the above-described component elements of hardware according to the present disclosure may be configured with one or more components, and the names of the corresponding component elements may vary based on the type of electronic device. According to various example embodiments, the electronic device (for example, the electronic device 201) may not include some elements, or may further include additional elements. Some elements may be coupled to constitute one object, but the electronic device may perform the same functions as those of the corresponding elements before being coupled to each other.

Figure 3:
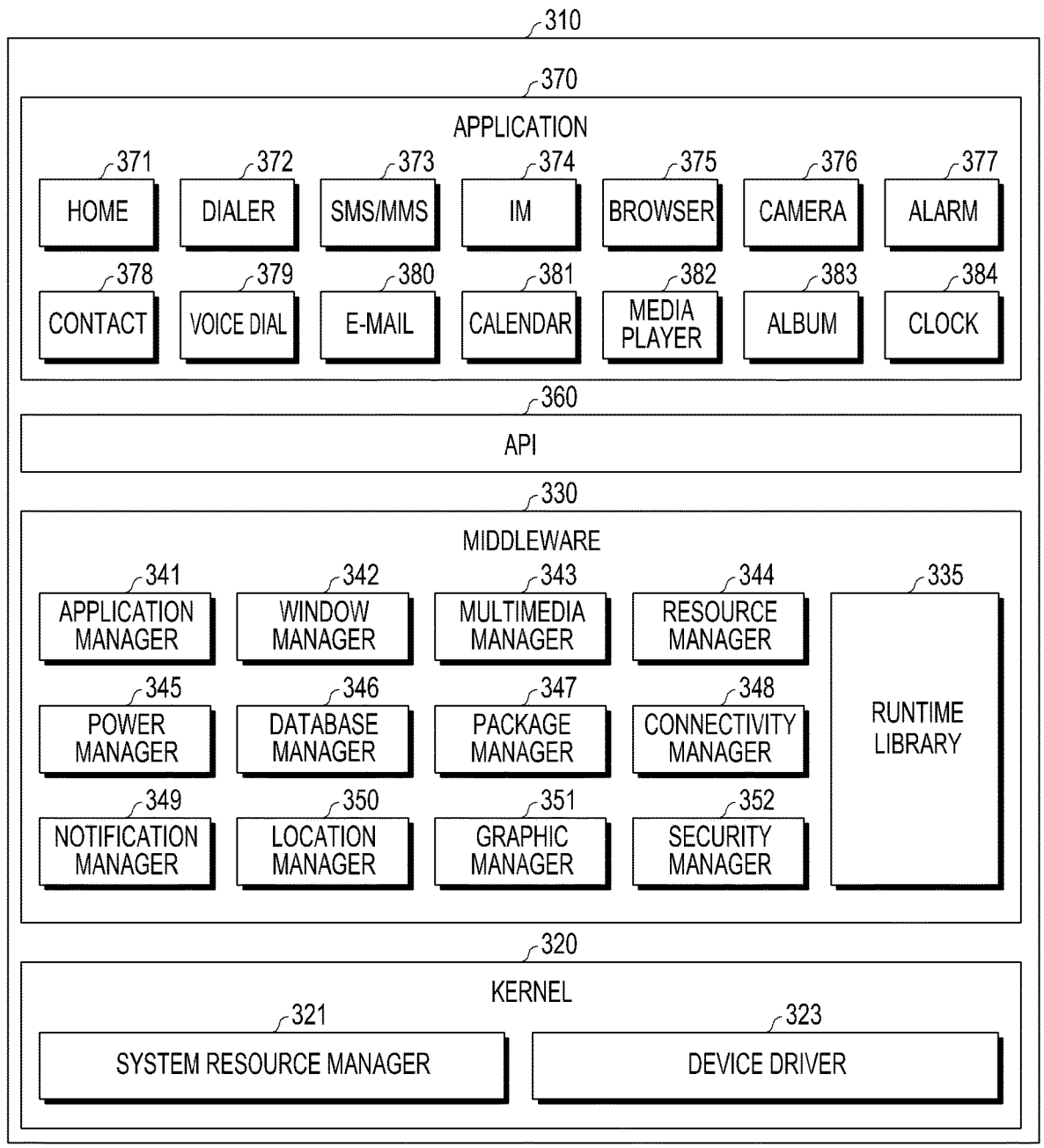
FIG. 3 is a block diagram illustrating a programming module according to various embodiments.

FIG. 3 is a block diagram illustrating a program module according to various embodiments. According to an example embodiment, the program module 310 (for example, the program 140 shown in FIG. 1) may include an Operating System (OS) that controls resources relating to an electronic device (for example, the electronic device 101) and/or various applications (for example, the programs 147) that are driven on the operating system. The operating system may include, for example, Android™, iOS™, Windows™, Symbian™, Tizen™, or Bada™. Referring to FIG. 3, the program module 310 may include a kernel 320 (for example, the kernel 141), middleware 330 (for example, the middleware 143 shown in FIG. 1), an API 360 (for example, the API 145 shown in FIG. 1), and/or applications 370 (for example, the programs 147). At least a part of the program module 310 may be preloaded on the electronic device, or may be downloaded from an external electronic device (for example, the electronic device 102 or 104 or the server 106).

The kernel 320 may include, for example, a system resource manager 321 and/or a device driver 323. The system resource manager 321 may control, allocate, or retrieve system resources. According to an example embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may provide, for example, a function required by the applications 370 in common, or may provide various functions to the applications 370 through the API 360 such that the applications 370 can efficiently use the limited system resources within the electronic device. According to an example embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage input/output, manage memory, or process arithmetic functions. The application manager 341 may manage, for example, the life cycles of the applications 370. The window manager 342 may manage GUI resources used for a screen. The multimedia manager 343 may identify formats required for reproducing various media files, and may encode or decode a media file using a codec suitable for the corresponding format. The resource manager 344 may manage the source code of the applications 370 or space in memory. The power manager 345 may manage, for example, the capacity or power of a battery, and may provide power information required for operating the electronic device. According to an example embodiment, the power manager 345 may operate in conjunction with a Basic Input/Output System (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide information on an event (for example, an arrival message, an appointment, a proximity notification, or the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an example embodiment, the middleware 330 may include a telephony manager for managing a voice or video call function of the electronic device or a middleware module that is capable of realizing a combination of the functions of the above-described elements. According to an example embodiment, the middleware 330 may provide specialized modules according to the operating system. The middleware 330 may dynamically omit some of the existing elements or add new elements. The API 360 is, for example, a set of API programming functions, and may be provided with different configurations according to the operating system. For example, in the case of Android or iOS, one API set may be provided for each platform, and in the case of Tizen, two or more API sets may be provided for each platform.

The applications 370 may include, for example, a home application 371, a dialer application 372, an SMS/MMS application 373, an instant messaging (IM) application 374, a browser application 375, a camera application 376, an alarm application 377, a contact application 378, a voice dial application 379, an email application 380, a calendar application 381, a media player application 382, an album application 383, a watch application 384, a health-care application (for example, for measuring exercise quantity or blood glucose), or an application providing environmental information (for example, atmospheric pressure, humidity, or temperature information). According to an example embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device and provide the received notification information to a user. The device management application may install, delete, or update the functions (for example, turning on/off the external electronic device itself (or some elements thereof) or adjusting the brightness (or resolution) of a display) of an external electronic device that communicates with the electronic device or applications executed in the external electronic device. According to an example embodiment, the applications 370 may include applications (for example, a health care application of a mobile medical appliance) that are designated according to the attributes of an external electronic device. According to an example embodiment, the applications 370 may include applications received from an external electronic device. At least some of the program module 310 may be implemented (for example, executed) by software, firmware, hardware (for example, the processor 210), or a combination of two or more thereof, and may include a module, a program, a routine, an instruction set, or a process for performing one or more functions. According to various example embodiments, an electronic device (for example, the electronic device 101) may include at least one processor and a memory electrically connected to the at least one processor, and the memory may store instructions to recognize a received first voice, recognize a first speaker based on the recognized first voice, and determine a response corresponding to the first voice based on the result of the recognition of the first speaker.

According to various example embodiments, the instructions may cause the processor to select a response corresponding to the recognized voice according to the result of a comparison between the first speaker, recognized based on the received first voice, and a pre-stored speaker model.

According to various example embodiments, when the first speaker corresponds to the speaker model, the instructions may cause the processor to update the speaker model based on voice data of the received first voice.

According to various example embodiments, the instructions may cause the processor to select the response corresponding to the recognized first voice from among a plurality of pre-stored responses based on the result of the recognition of the first speaker.

According to various example embodiments, the instructions may cause the processor to generate the response corresponding to the recognized first voice using at least some of a plurality of pre-stored responses based on the result of recognition of the first speaker.

According to various example embodiments, the instructions may cause the processor to determine the response corresponding to the recognized first voice by performing natural language processing on the recognized first voice.

According to various example embodiments, the instructions may cause the processor to extract a characteristic of the first speaker from the received first voice, calculate a score indicating a similarity between the first speaker and the speaker model based on the extracted characteristic and at least one speaker model stored in the memory, and determine the response corresponding to the first voice based on the calculated score.

According to various example embodiments, the memory may store a plurality of score sections and a plurality of responses of the speaker model corresponding to each of the plurality of score sections, and the instructions may cause the processor to select the response corresponding to the recognized first voice from among the plurality of responses of the speaker model in a score section into which the calculated score falls among the plurality of score sections.

According to various example embodiments, the instructions may cause the processor to control a range of the score section into which the calculated score falls based on the recognized first voice and the calculated score.

According to various example embodiments, the electronic device may further include a microphone that receives the first voice and an output device, and the instructions may cause the processor to output the response corresponding to the recognized first voice through the output device. The output device may include a speaker device (for example, the speaker device 282) and/or a display (for example, the display 160).

According to various example embodiments, the electronic device may further include a communication interface (for example, the communication interface 170), and the instructions may cause the processor to transmit the response to the recognized first voice to another electronic device through the communication interface.

According to various example embodiments, the instructions may cause the processor to extract a characteristic of the first speaker from the received first voice, determine a speaking style of the first speaker based on the extracted characteristic, and change the response corresponding to the first voice in accordance with the determined speaking style.

Figure 4:
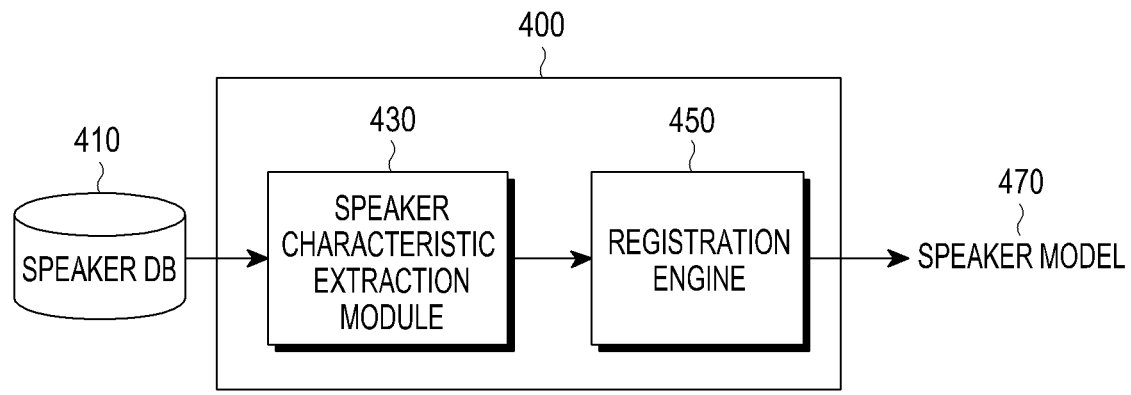
FIG. 4 is a block diagram illustrating an operation of registering a speaker model by an electronic device according to various embodiments.

FIG. 4 is a block diagram illustrating an electronic device (for example, the electronic device 101/201) registering a speaker model according to various example embodiments.

According to an example embodiment, the electronic device may register (generate) and/or update a speaker model (also referred to as a speaker) based on speaker's voice data accumulated through continuous but minimal use of a speaker database (speaker DB) 410. According to another example embodiment, the electronic device may register and/or update a speaker model through use of a large speaker database 410 for registering speaker models. The speaker model may correspond to modeling of a characteristic of a particular speaker's voice, and may be generated by extracting a voice characteristic (characteristic vector) from the particular speaker's voice.

According to an example embodiment, the electronic device may register (store) one or more speaker models in a separate database, and when the electronic device registers a plurality of speaker models, may allocate a separator to each speaker. The electronic device may be configured to register various speakers.

Referring to FIG. 4, a speaker registration module 400 of the electronic device 101/201 may include a speaker characteristic extraction module 430 and a registration engine 450. The speaker registration module 400 may be included in the processor 120 (or 210) of FIG. 1. For example, the speaker registration module 400 may register (generate) and/or update a speaker model 470 corresponding to a speaker of voice data based on one or more pieces of voice data accumulated in the speaker database 410 (speaker DB). The speaker database 410 may store one or more pieces of voice data of one or more speakers. The speaker database 410 may be included in the processor 120 (or 210) or the memory 130 (or 230) of FIG. 1, for example, or may be a separate database connected to the electronic device.

The speaker characteristic extraction module 430, including speaker extraction circuitry, may extract speaker characteristics including speaker's features from the voice data included in the speaker database 410 in order to recognize the speaker (e.g., identify the speaker and/or distinguish between speakers). For example, the speaker characteristic extraction module 430 may acquire the speaker characteristic(s) by extracting a voice characteristic(s) (for example, a characteristic vector) from the voice data included in the speaker database 410. A parameter used as the speaker characteristic may be a Mel-Frequency Cepstral Coefficient (MFCC).

The registration engine 450 may register the speaker of the voice data, for example, generate a speaker model based on the extracted speaker characteristic. For example, the registration engine 450 may generate the speaker model of the voice data based on the extracted speaker characteristic by applying various technologies, such as a Gaussian Mixture Model (GMM)-based speaker model or an i-vector-based speaker model. In addition, probability information on a phoneme spoken by the speaker may be used to further improve the performance.

According to an example embodiment, the electronic device including the speaker registration module 400 may be a server capable of supporting the amount of calculations required by, and the performance of, the speaker model. When the electronic device including the speaker registration module 400 is a server, every electronic device communicating with the server may register one or more corresponding speaker models. Accordingly, the server may store one or more speaker models for each electronic device. For example, when one speaker model is stored per electronic device, the server may distinguish between speaker models based on identification information of the electronic device (for example, identification information such as an ID or a phone number).

According to another example embodiment, a terminal device (for example, a smart phone) may be developed to perform the operation for registering the speaker models.

According to yet another example embodiment, the operation for registering the speaker models may be used in common by IoT devices in a home environment.

Figure 5:
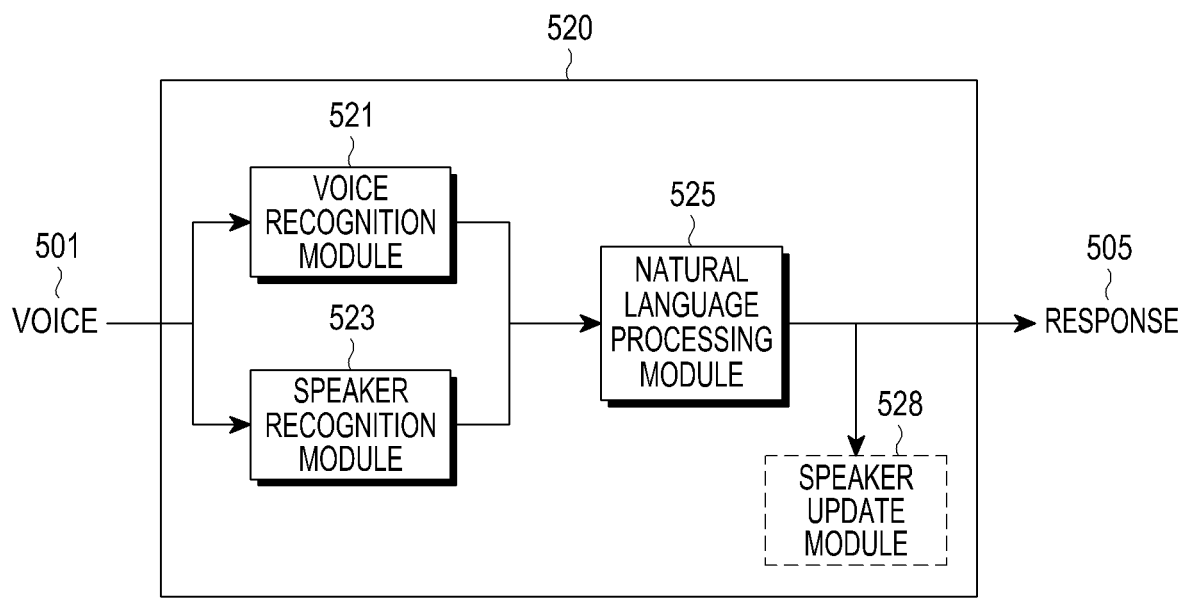
FIG. 5 is a block diagram illustrating a processor of an electronic device according to various embodiments.

FIG. 5 is a block diagram illustrating a processor (for example, the processor 120/210) of an electronic device (for example, the electronic device 101/201) according to various example embodiments.

Referring to FIG. 5, a processor 520 may include a voice recognition module 521, a speaker recognition module 523, and a natural language processing module 525, each of which may include circuitry for performing the respective functions. In addition, the processor 520 may further include a speaker update module 528.

The voice recognition module 521 may perform voice recognition on a voice 501 received through voice recognition technology. The voice recognition module 521 may include a voice characteristic extraction module 603 and/or a voice recognition module 605 described below.

The speaker recognition module 523 may recognize a speaker of the voice 501 received through voice recognition technology.

According to an example embodiment, the speaker recognition module 523 may recognize a speaker of the received voice 501 based on the received voice 501. It is determined whether the speaker of the received voice 501 corresponds to a registered first speaker model. When it is determined that the speaker of the received voice 501 corresponds to the registered first speaker model, the speaker of the received voice 501 may be determined as a first speaker of the first speaker model. For example, the speaker recognition module 523 may calculate a score (also referred to as matching accuracy between the recognized speaker and the speaker of the registered speaker model) indicating a similarity between the recognized speaker and the first speaker of the first speaker model, among registered speaker models. The speaker of the received voice 501 may be determined as the first speaker of the first speaker model according to the calculated score.

The speaker recognition module 523 may include a speaker characteristic extraction module 607 and/or a speaker determination module 609 (also referred to as a speaker verification module) of FIG. 6 described below.

The natural language processing module 525 may determine a response corresponding to a voice recognition result of the voice recognition module 521 based on a speaker recognition result of the speaker recognition module 523.

According to an example embodiment, the natural language processing module 525 may catch the meaning of the recognized voice 501 through natural language processing technology. According to an example embodiment, the natural language processing module 525 may derive a response (result) 505 for performing an operation corresponding to the recognized voice 501 based on the determined first speaker and the score indicating the similarity with the first speaker according to the speaker recognition result by the speaker recognition module 523. For example, a response corresponding to each of similarity score sections and speaker-specific voices may be pre-designated, or a response generation method corresponding to each of similarity score sections and speaker-specific voices may be preset. The corresponding operation may be, for example, an operation of performing at least one of various functions, such as those relating to a call, a message, a web search, weather, a map, settings, a local search, and execution of an application.

According to various example embodiments, when the received voice 501 utters "What's the weather like today?", the electronic device may recognize the voice 501 through the above-described elements, recognize a speaker of the voice 501, determine a score of the recognized speaker, and determine and output a corresponding response. For example, when the score of the recognized speaker falls into a first score section, the electronic device may acquire weather information in order to provide a proper response to the voice 501 and may output a response, for example, "Hi, John, today is very sunny and a nice day to go outside". In another example, when the score of the recognized speaker falls into a second score section, the electronic device may output a designated response to be provided to the recognized speaker in the second score section and/or a generated response to be provided to the recognized speaker in the second score section, for example, the response "Your voice is very similar to John's voice. I accept your request this time, but in the future I will only respond to John's voice!", and may acquire and output weather information. In yet another example, when the score of the recognized speaker falls into a third score section, the electronic device may output a designated response to be provided to the recognized speaker in the third score section (or a generated response to be provided to the recognized speaker in the third score section), for example, a response "I only respond to John's voice. You are not John".

The natural language processing module 525 may include a natural language processing module 611 and a response determination and selection module 615 of FIG. 6 described below.

The speaker update module 528, which may include speaker update circuitry, may update speaker models by continuously collecting voice data of received voices. For example, it is possible to improve the performance of speaker-specific voice recognition by accumulating pieces of voice data collected through a plurality of speakers and updating speaker models.

The speaker update module 528 may include a voice collection module 618 and/or a speaker model update module 621 of FIG. 6 described below.

Figure 6:
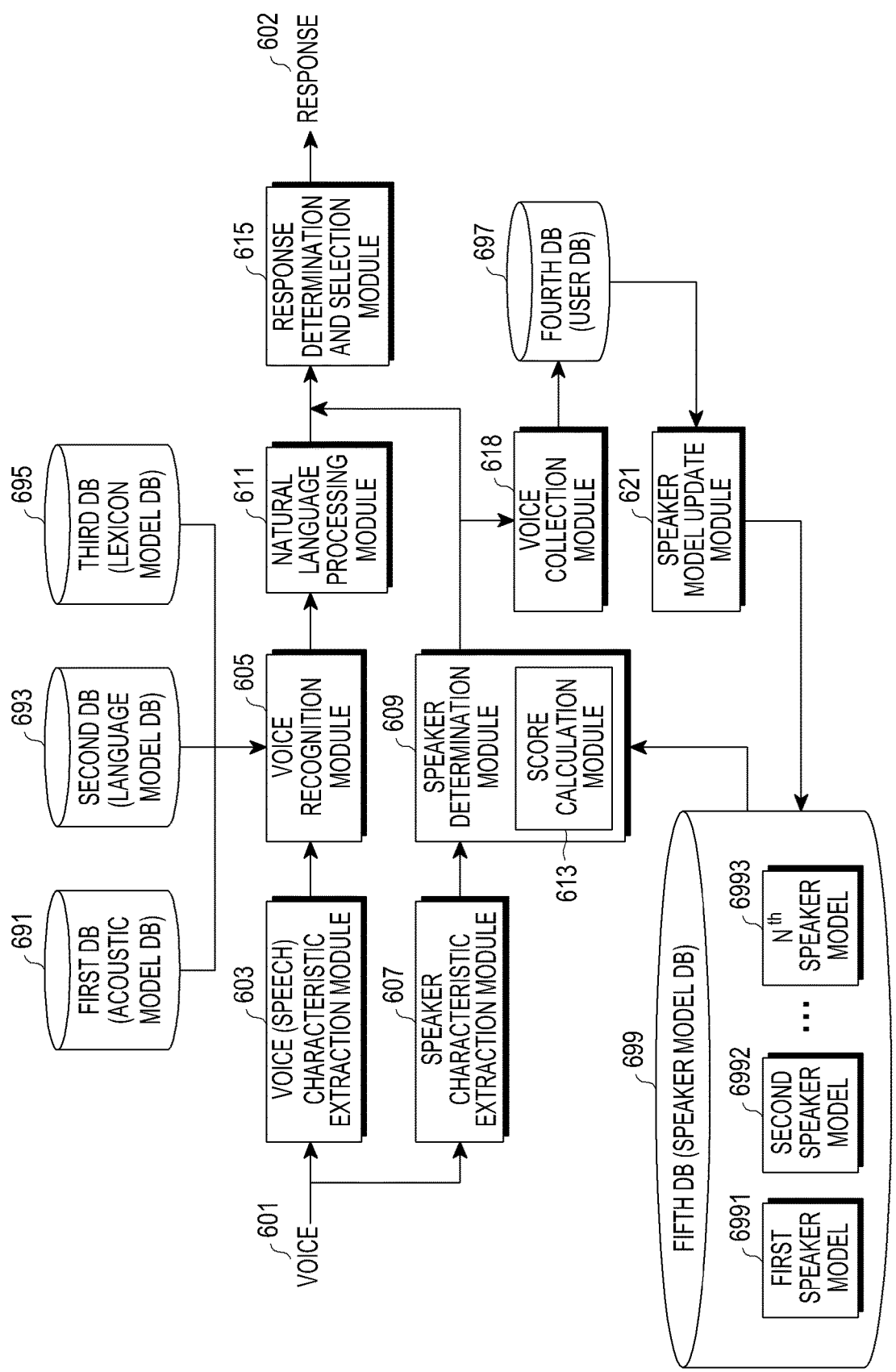
FIG. 6 is a detailed block diagram illustrating an electronic device according to various embodiments.
Figure 7:
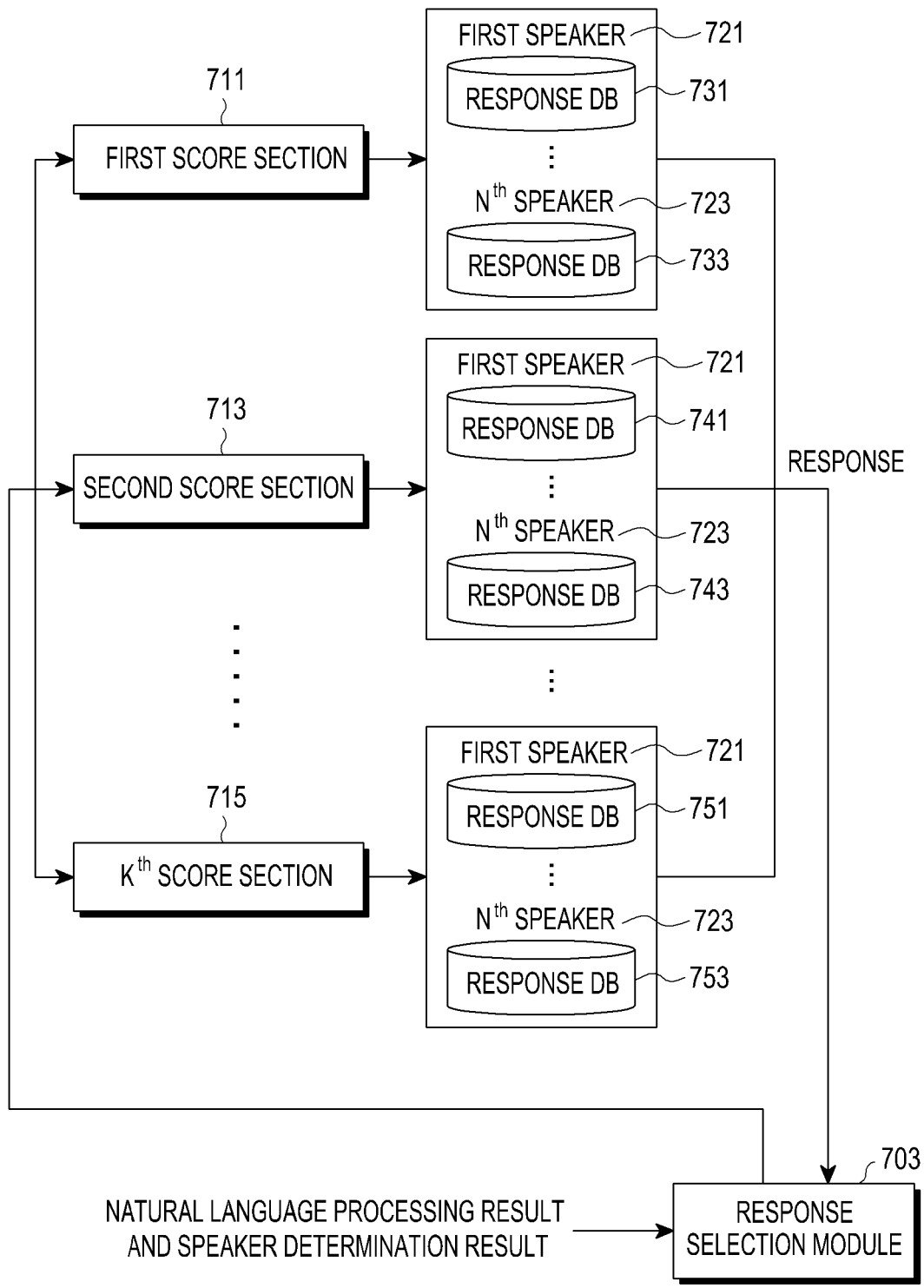
FIG. 7 is a detailed block diagram illustrating a response determination and selection module included in an electronic device according to various embodiments.

FIG. 6 is a detailed block diagram illustrating an electronic device 101/201 according to various example embodiments. FIG. 7 is a detailed block diagram illustrating a response determination and selection module included in an electronic device according to various example embodiments. According to an example embodiment, based on a particular threshold value, when similarity between voice data of a received voice and stored voice data falls into a section exceeding the threshold value, the speaker identification reference may determine that the speaker of the received voice is the speaker of the stored voice data. When the similarity does not exceed the threshold value, it may be determined that the speaker of the received voice is a non-speaker (unregistered speaker), and, when it is determined that speaker of the received voice is the speaker, a corresponding response may be output. However, referring to FIGS. 6 and 7, the electronic device may calculate a similarity score between one of the speakers of pre-registered speaker modules and the speaker of the received voice, which is the speaker recognition result, and may output a predetermined response based on the similarity score or generate and then output a response through a predetermined response scheme. This is a scheme for compensating for uncertainty of the speaker recognition result, which can be used to provide a more familiar service to users to maximize the usability of the voice recognition function through the use of the similarity score of the speaker.

Referring to FIG. 6, the processor, including processing circuitry, of the electronic device may include a voice characteristic extraction module 603, a voice recognition module 605, a speaker characteristic extraction module 607, a speaker determination module 609, a natural language processing module 611, and a response determination and selection module 615. In addition, the electronic device may further include a voice collection module 618 and a speaker model update module 621.

The voice characteristic extraction module 603 may extract a voice characteristic (for example, a characteristic vector) of a received voice 601. For example, the voice characteristic extraction module 603 may extract the voice characteristic of the received voice 601 by removing areas other than a voice area of noise or a human's voice.

The voice recognition module 605 may execute voice recognition according to the voice characteristic extracted through the voice characteristic extraction module 603. For example, the voice recognition module 605 may execute voice recognition of the received voice 601 based on the extracted voice characteristic using at least one of an acoustic model stored in a first database 691, a language model stored in a second database 693, and/or a lexicon stored in a third database 695. The first database 691 may be an acoustic model database that stores one or more acoustic models, the second database 693 may be a language model database that stores one or more language models, and the third database 695 may be a lexicon database that stores one or more lexicons. The first to third databases 691, 693, and 695 may be included in the electronic device or may be separate databases connected to the electronic device.

The speaker characteristic extraction module 607 may extract a speaker characteristic from the received voice 601. For example, the speaker characteristic extraction module 607 may acquire the speaker characteristic by extracting a voice characteristic (for example, a characteristic vector) from voice data of the received voice.

The speaker determination module 609, which may include speaker determination circuitry, may determine whether the speaker of the received voice 601 is the speaker of the registered (stored) speaker model based on the speaker characteristic extracted through the speaker character extraction module 607. For example, the speaker determination module 609 may determine a speaker model corresponding to the speaker of the received voice 601 by verifying whether the speaker of the received voice 601 corresponds to one of speaker models, for example, a first speaker model 6991, a second speaker model 6992, . . . , an $n^{th}$ speaker model 6993 stored in a fifth database 699 (also referred to as a speaker model database 699). The fifth database 699 may be included in the electronic device, or may be a separate database connected to the electronic device.

The speaker determination module 609 may include a score calculation module 613, which may include score calculation circuitry. The score calculation module 613 may calculate a score indicating a similarity between the speaker of the received voice and a speaker of one of the registered speaker models. Further, the score calculation module 613 may determine whether the received speaker is the speaker of the registered speaker model based on the speaker similarity score.

The calculation of the speaker similarity score may be performed by measuring a similarity between a vector corresponding to a pre-registered speaker model and a vector extracted from the received voice. For example, when the vector corresponding to the pre-registered speaker model and the vector extracted from the received voice are A and B, respectively, the similarity may be calculated based on Equation (1) below.

$$\text{similarity}(A, B) = \frac{A \cdot B}{|A||B|} \qquad \text{Equation (1)}$$

(A and B denote inner products of A and B, |A| denotes the size of A, and |B| denotes the size of B).

Meanwhile, in addition to and/or instead of Equation (1) above, various similarity calculation technologies may be applied depending on the type of speaker model.

The natural language processing module 611 may receive a voice recognition result from the voice recognition module 605. The natural language processing module 611 may process the voice recognized based on the voice recognition result in natural language through natural language processing technology.

The response determination and selection module 615 may determine and output a response 602 based on the natural language processing result and the speaker determination result received from the natural language processing module 611 and the speaker determination module 609. The speaker determination result may include, for example, a score indicating similarity with the speaker of the registered first speaker model, calculated by the score calculation module 613.

The response determination and selection module 615 may be the response selection module 703 of FIG. 7, which may include response selection circuitry.

Referring to FIG. 7, a response corresponding to each of the similarity score sections and speaker-specific voices may be designated. A response database corresponding to each speaker may be set in each of a plurality of predetermined score sections, such as a first score section 711, a second score section 713, . . . , $k^{th}$ score section 715. According to an example embodiment, a response database 731 corresponding to a first speaker 721, . . . , a response database 733 corresponding to an $n^{th}$ speaker 723 may be preset in the first score section 711. According to an example embodiment, a response database 741 corresponding to the first speaker 721, . . . , a response database 743 corresponding to the $n^{th}$ speaker 723 may be preset in the second score section 713. According to an example embodiment, a response database 751 corresponding to the first speaker 721, . . . , a response database 753 corresponding to the $n^{th}$ speaker 723 may be preset in the $k^{th}$ score section 715.

Referring to FIG. 7, the response selection module 703 may identify a score section into which the similarity score corresponding to the speaker determination result falls among the first to $k^{th}$ score sections 711, 713, and 715. According to an example embodiment, the response selection module 703 may identify (e.g., select) a response corresponding to the natural language processing result included in the response database of the speaker in the identified score section. For example, when the received similarity score falls into the first score section 711 and the speaker is the first speaker 721, the response selection module 703 may select a response corresponding to the natural language processing result among the responses included in the response database 731 of the first speaker 721. According to an example embodiment, the responses included in the response database 731 may be stored in advance. According to another example embodiment, the responses included in the response database 731 may be set (generated and/or updated) in real time under various conditions such as a natural language processing result, a current time, current weather, the location of the electronic device, movement of the electronic device, and/or a function currently being executed by the electronic device.

For example, when the score sections are divided into three sections, the three sections may include a first score section having a very high score or score range, a second score section having a score or score range close to a threshold value, and a third score section having a very low score or score range. In the first score section and the third score section, the response may be set to clearly process the received voice. In the second score section, the response may be set to perform processing such that the possibility of being recognized as the speaker is higher or such that a proper response of the received voice is generated.

In the first score section, responses may be stored or generated to respond to a desired question based on the natural language processing result.

In the third score section, one response of the following examples may be pre-designated or generated, and, for example, when the score falls in the third section, the electronic device may determine that the speaker of the received voice is a non-speaker (unregistered speaker).

1. Your voice is not familiar.
2. Are you 00? I catch only 00's voice.
3. Are you 00? I respond only to 00.
4. Oh! You are not 00.
5. I am a 00 lover. I provide help only when asked by 00.

In the second score section, one response of the following examples may be pre-designated or generated.

1. You have a voice similar to that of 00. I grant your request only this time.
2. You are good at vocal mimicry. Your efforts are commendable, so I grant your request only this time.
3. Wow, your voice is similar to a familiar voice I have heard. I will overlook the difference this time due to the familiarity of your voice.

According to an example embodiment, the response according to each score section may be generated and stored in a table form. The electronic device may select threshold values for dividing score sections, divide the score sections, and generate and store responses in a table form.

According to an example embodiment, the electronic device may update the above-listed response phrases. For example, the electronic device may analyze a speaking style and/or preference of the speaker, change initially designated response phrases to phrases corresponding to the analyzed speaking style and/or preference, and output a response. For example, when an input voice of the recognized speaker corresponds to informal speech, the electronic device may change a corresponding response to informal speaking. When the input voice of the recognized speaker corresponds to formal speech, the electronic device may change the corresponding response to formal speech. In another example, when the input voice of the recognized speaker is analyzed and determined to be a dialect used in a particular region, the electronic device may change the response to the dialect of the particular region. In still another example, when the input voice of the recognized speaker is in English, the electronic device may change the response to English. When the input voice of the recognized speaker corresponds to Japanese, the electronic device may change the response to Japanese.

The voice collection module 618 may store voice data of the received voice in a fourth database 697 (for example, a user database). For example, the voice collection module 618 may store the voice data of the received voice as voice data of the speaker determined through the speaker determination module 609. The fourth database 697 may be included in the speaker update module 528 or the memory of the electronic device, or may be a separate database.

The speaker model update module 621 may update one of speaker models corresponding to the speaker, for example, a first speaker model 6991, a second speaker model 6992, . . . , an n$^{th}$ speaker model 6993 based on the voice data of the speaker determined through the speaker determination module 609.

According to an example embodiment, the electronic device may be a server, and may perform the operations of the modules of FIG. 6 by receiving the voice from a particular electronic device through a communication interface. According to an example embodiment, the electronic device may transmit the response to the particular electronic device through the communication interface.

According to another example embodiment, the electronic device may include a microphone and perform the operations of the modules of FIG. 6 by receiving the voice through the microphone. Further, when outputting the response, the electronic device may output the response through an output device of the electronic device. For example, the electronic device may output the response through a speaker device (for example, the speaker device 282) in the form of a voice and/or may display the response on a screen of a display (for example, the display 160).

Figure 8:
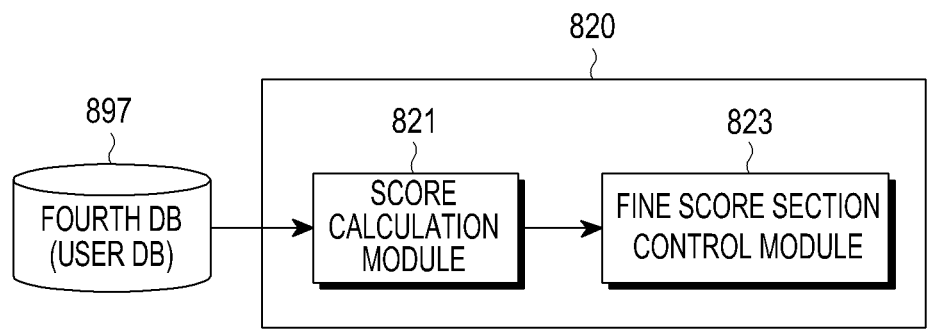
FIG. 8 is a block diagram illustrating the part of an electronic device that subdivides score sections of a speaker according to various embodiments.

FIG. 8 is a block diagram illustrating the part of an electronic device that subdivides score sections of the speaker according to various example embodiments.

Referring to FIG. 8, the electronic device may include a fine score section control module 823 for more finely controlling score sections.

The fine score section control module 823, which may include fine score control circuitry, may further subdivide the score sections of the speaker and variously output responses thereto to each speaker. A method of dividing the score sections of the speaker by the fine score section control module 823 may use statistical information of the calculated scores based on a fourth database 897 (for example, the fourth database 697) accumulated from various speakers. For example, the score sections may be divided by applying a random effective variable rate to a value acquired by the statistical information of the calculated score for each speaker. Thereafter, when the speaker model is updated using the voice data of the speaker acquired by the voice collection module (for example, the voice collection module 618), the speaker model may be regularly modified based on the score distribution of the speaker. For example, when every speaker has a different score section and applies a predetermined score section, the electronic device may not provide a proper response. Accordingly, the electronic device may control the range of the score section by analyzing the used voice data and the score distribution of the speaker. Meanwhile, when a section to minimize an error is selected through the subdivision of score sections, a private service or a service for protecting personal information can be used.

According to an example embodiment, the electronic device may execute a plurality of speaker recognition operations and reselect threshold values for dividing the score sections according to score distribution of the speaker.

For example, when a plurality of scores is calculated for a first speaker, the ratio of the scores that fall into a first score section corresponding to a score range from 90 to 100 is 1%. However, when the ratio of the scores that fall into a second score section corresponding to a score range from 70 to 89 of the first speaker is 50%, the electronic device may reselect the range from 70 to 100 as the first score section.

In another example, the electronic device may execute a plurality of speaker recognition operations and reselect threshold values for dividing the score sections between a registered speaker and an unregistered speaker according to the score distribution of the registered speaker and the score distribution of the unregistered speaker. For example, in the case in which a particular score (for example, 50) is designated as a threshold value for determining a registered speaker and an unregistered speaker, the speaker of a received voice having a score lower than 50 is determined to be the unregistered speaker, and the speaker of a received voice having a score higher than or equal to 50 is determined to be the registered speaker, if a percentage, at which the score of the first speaker is 49, is 70% and a percentage, at which the score of the first speaker is 50, is 20%, the threshold value for determining the registered speaker and the unregistered speaker may be re-selected as 49.

Figure 9:
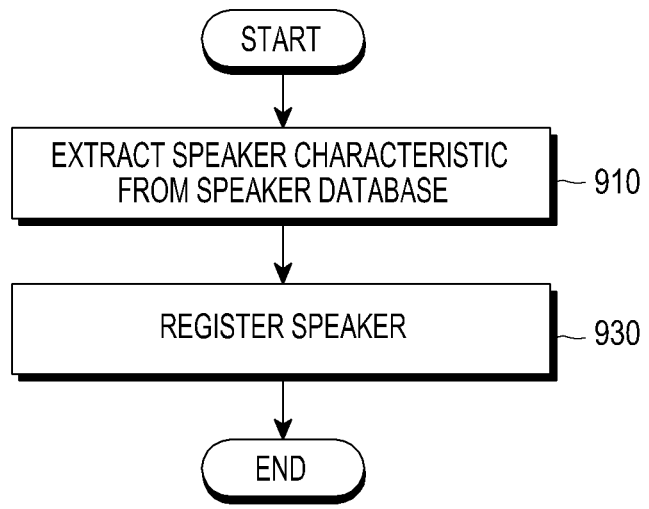
FIG. 9 is a flowchart illustrating an operation of generating a speaker model by an electronic device according to various embodiments.

FIG. 9 is a flowchart illustrating an operation of generating a speaker model by an electronic device according to various example embodiments.

In operation 910, the electronic device may extract a speaker characteristic from a speaker database. For example, the electronic device may acquire a speaker characteristic by extracting voice characteristic information from a voice database included in the speaker database. The speaker database may store one or more pieces of voice data corresponding to one or more speakers.

In operation 930, the electronic device may perform speaker registration based on the extracted speaker characteristic. For example, the electronic device may generate a speaker model based on the extracted speaker characteristic. For example, the electronic device may generate a speaker model of voice data of the speaker (or register the speaker of the voice data) based on the extracted speaker characteristic by applying various technologies such as a GMM-based speaker model or an i-vector-based speaker model.

Figure 10:
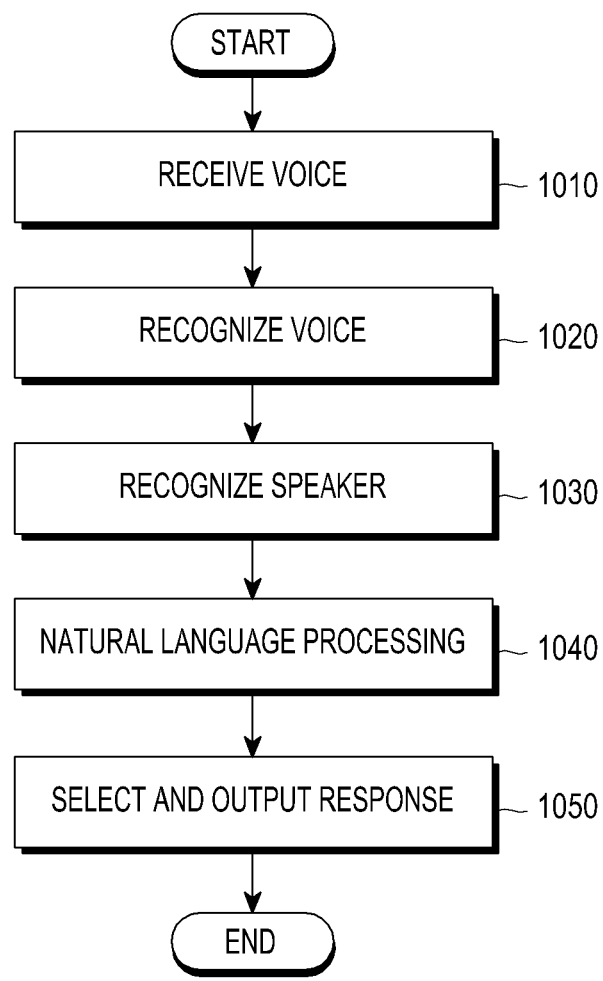
FIG. 10 is a flowchart illustrating an operation of providing a response corresponding to a voice input by an electronic device according to various embodiments.

FIG. 10 is a flowchart illustrating an operation of providing a response corresponding to a voice input by an electronic device according to various example embodiments.

The electronic device may receive a voice of a speaker in operation 1010. For example, the electronic device may receive a voice input through a microphone. The microphone may be automatically activated when the electronic device meets a predetermined condition. The predetermined condition may include, for example, one or more of execution of a predetermined function of the electronic device (for example, a predetermined application or a predetermined mode), detection of a predetermined movement of the electronic device, and detection of a predetermined user input (a touch or button press) into the electronic device. In another example, the electronic device may receive a voice from an external electronic device through a communication interface.

In operation 1020, the electronic device may recognize the received voice through voice recognition technology.

In operation 1030, the electronic device may recognize a speaker of the received voice through speaker recognition technology. For example, the electronic device may identify whether the speaker of the received voice matches one of the speakers of the registered speaker models (hereinafter referred to as a first speaker) and determine a similarity score indicating the degree of matching with the first speaker. For example, when it is determined that the speaker of the received voice is an 80% match with the first speaker, the similarity score may be 80. For example, the electronic device may determine whether the speaker of the received voice is a registered speaker or an unregistered speaker based on the similarity score for the first speaker.

In operation 1040, the electronic device may perform natural language processing on the received voice through natural language processing technology.

In operation 1050, the electronic device may select and output a response corresponding to the received voice based on the natural language processing result and the speaker recognition result.

For example, the electronic device may determine and output a response corresponding to the natural language processing result of the received language in a response table according to a score section into which the similarity score corresponding to the speaker recognition result falls.

For example, when the speaker of the received voice is a registered speaker, the similarity score may be high, and accordingly, a proper response to the received voice may be output. When the speaker of the received voice is a registered speaker, the electronic device may identify a response corresponding to the natural language processing result of the received language in a response table (hereinafter, referred to as a first response table) according to a score section into which a similarity score calculated through the above-described operation falls. Responses contained in the first response table may be set to be respective proper responses for received voices.

In another example, when the speaker of the received voice is an unregistered speaker, the similarity score may be low, and accordingly, a response to the received voice corresponding to the low similarity score may be output. For example, compared to the registered speaker, a relatively improper response to the received voice may be output. When the speaker of the received voice is an unregistered speaker, the electronic device may identify a response corresponding to the natural language processing result of the received language in a response table (referred to as a second response table) according to a score section into which a similarity score, calculated through the above-described operation, falls. Responses contained in the second response table may have lower satisfaction for the response to the received voice compared to the responses contained in the first response table.

Figure 11A:
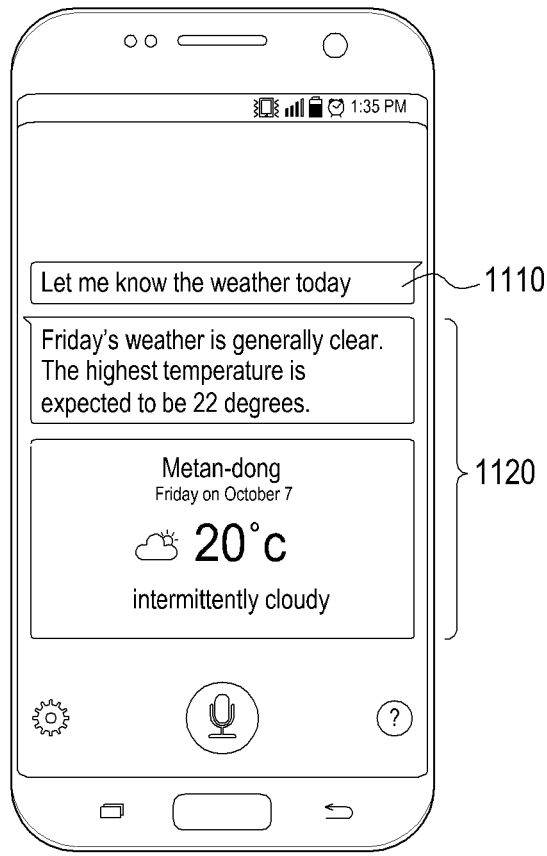
FIGS. 11A and 11B illustrate screen examples for a response result corresponding to a voice input by an electronic device according to various embodiments.
Figure 11B:
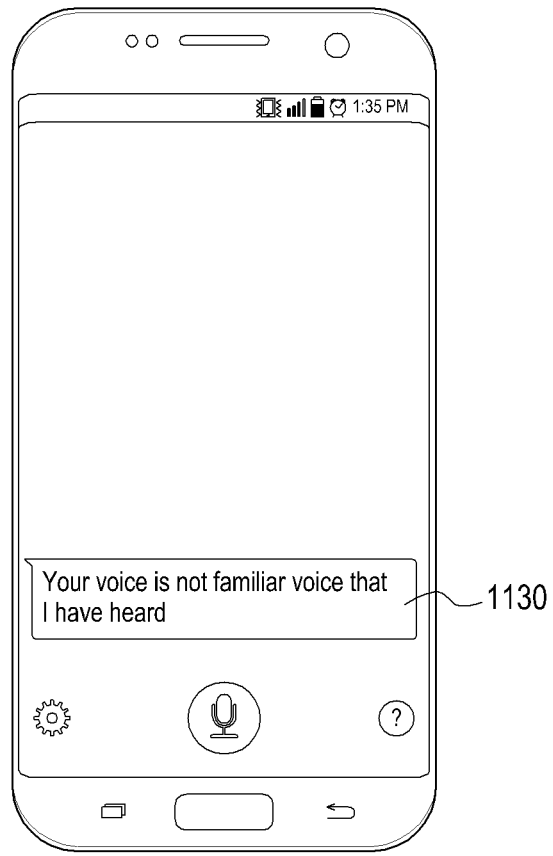

FIGS. 11A and 11B illustrate screen examples for a response result corresponding to a voice input by an electronic device according to various example embodiments.

The user may make a voice input "Let me know the weather today" through a microphone of the electronic device 101/201.

The electronic device 101/201 may display the user's input voice "Let me know the weather today" 1110 on a screen of the electronic device as illustrated in FIG. 11A. Further, according to the above-described example embodiments, when the electronic device determines the user to be a speaker of a preset speaker model, weather information 1120, which is a proper response to the user's input voice, may be displayed on the screen of the electronic device as illustrated in FIG. 11A. In addition, the electronic device may output the weather information 1120 in a voice form through a speaker device of the electronic device.

When the electronic device determines that the user is not the speaker of the preset speaker model, a predetermined response 1130 such as "Your voice is not a familiar voice I have heard" is displayed on the screen of the electronic device as illustrated in FIG. 11B. In addition, the electronic device may output the predetermined response 1130 in a voice form through the speaker device of the electronic device.

Figure 12:
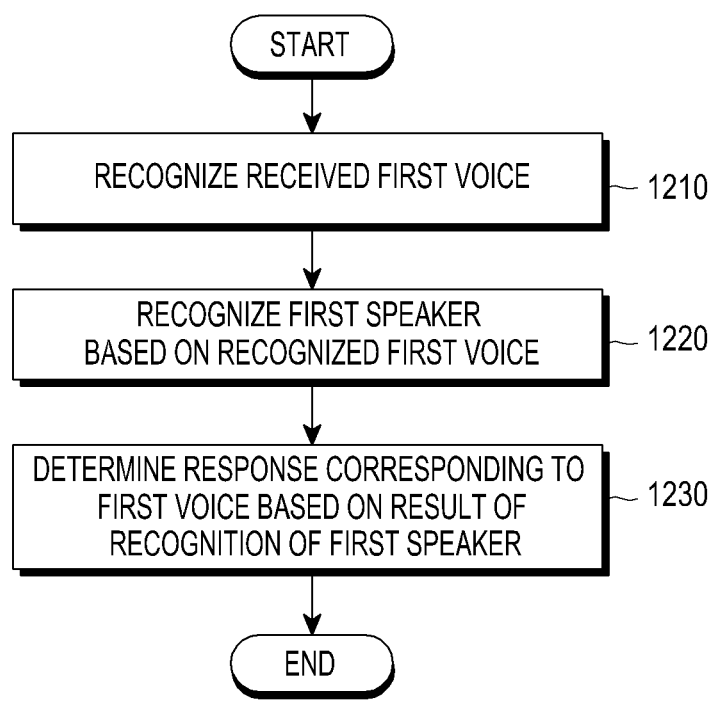
FIG. 12 is a flowchart illustrating an operation of responding to an input voice by an electronic device (for example, the electronic device 101) according to various embodiments.

FIG. 12 is a flowchart illustrating an operation of responding to an input voice by an electronic device (for example, the electronic device 101/201) according to various example embodiments.

In operation 1210, the electronic device may recognize a received first voice.

For example, when the electronic device is a server, the electronic device may receive a first voice and recognize the received first voice. In another example, the electronic device may receive the first voice through a microphone of the electronic device and recognize the received first voice.

In operation 1220, the electronic device may recognize a first speaker based on the recognized first voice.

For example, the electronic device may calculate a score indicating a similarity based on matching between a pre-stored speaker model and a speaker characteristic of the first voice, and may determine that a first speaker of the first voice is a second speaker corresponding to the pre-stored speaker model based on the calculated score, that the first speaker is not the second speaker, or that the first speaker is a speaker who cannot the second speaker.

In operation 1230, the electronic device may determine a response corresponding to the first voice based on the first speaker recognition result.

For example, when it is determined that the first speaker of the first voice is the second speaker corresponding to the pre-stored speaker model, the electronic device may determine a response corresponding to the first voice by performing natural language processing on the first voice. In another example, when it is determined that the first speaker of the first voice is not the second speaker of the pre-stored speaker model, the electronic device may determine a response indicating that the first speaker is not a registered speaker as the response corresponding to the first voice. In yet another example, when it is determined that the first speaker of the first voice is a speaker who cannot be determined as the second speaker of the pre-stored speaker model, the electronic device may determine a response corresponding to the first voice and provide only a speaker identification message or a limited response result.

According to an example embodiment, the electronic device may collect data on a speaker according to the operations of FIG. 12, and when a predetermined amount of data on a particular speaker is collected through execution of the operations of FIG. 12 several times, may generate and/or update a speaker model for the particular speaker.

According to various example embodiments, a method of responding to an input voice by an electronic device (for example, the electronic device 101) may include an operation of recognizing a received first voice, an operation of recognizing a first speaker based on the recognized first voice, and an operation of determining a response corresponding to the first voice based on the result of recognition of the first speaker.

According to various example embodiments, the operation of determining the response corresponding to the first voice based on the result of recognition of the first speaker may include an operation of selecting the response corresponding to the recognized voice according to the result of a comparison between the first speaker recognized based on the received first voice and a pre-stored second speaker.

According to various example embodiments, the operation of determining the response corresponding to the first voice based on the result of recognition of the first speaker may include an operation of determining the response corresponding to the recognized first voice by performing natural language processing on the recognized first voice.

According to various example embodiments, the operation of recognizing the first speaker based on the recognized first voice may include an operation of extracting a characteristic of the first speaker from the received first voice and an operation of calculating a score indicating a similarity between the first speaker and the speaker model based on the extracted characteristic and at least one speaker model stored in the memory, and the operation of determining the response corresponding to the first voice based on the result of the recognition of the first speaker may include an operation of determining the response corresponding to the first voice based on the calculated score.

According to various embodiments, the electronic device may store a plurality of score sections and a plurality of responses of the speaker model corresponding to each of the plurality of score sections, and the operation of determining the response corresponding to the first voice based on the result of the recognition of the first speaker may include an operation of selecting the response corresponding to the recognized first voice from among the plurality of responses of the speaker model in a score section into which the calculated score falls among the plurality of score sections.

According to various embodiments, the method may further include an operation of receiving the first voice through a microphone (for example, the microphone 288) of the electronic device and an operation of outputting the response corresponding to the recognized first voice through an output device of the electronic device. The output device may include, for example, a speaker device (for example, the speaker device 282) and/or a display (for example, the display 160).

According to various embodiments, the method may further include an operation of transmitting the response to the recognized first voice to another electronic device through a communication interface of the electronic device.

According to various embodiments, a machine-readable storage medium recording a program to perform a method of responding to an input voice by an electronic device is provided. The method may include an operation of recognizing a received first voice, an operation of recognizing a first speaker based on the recognized first voice, and an operation of determining a response corresponding to the first voice based on a result of the recognition of the first speaker.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the present disclosure may include one or more of the aforementioned elements or may further include other additional elements, or some of the aforementioned elements may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

What is claimed is:

1. An electronic device comprising:
   at least one processor; and
   a memory electrically connected to the at least one processor,
   wherein the memory stores instructions which when executed by the processor, control the electronic device to:
   recognize a received first voice indicating a request for an operation;
   recognize a first speaker based on the recognized first voice;
   extract a characteristic of the first speaker from the received first voice;
   calculate a score indicating a similarity between the first speaker and a pre-stored speaker model based on the extracted characteristic and the pre-stored speaker model stored in the memory;
   based on identifying that the score is larger than a first threshold, output a first response indicating that the first speaker matches the pre-stored speaker model and that the electronic device will perform the operation indicated by the request;
   based on identifying that the score is lower than or equal to the first threshold and higher than a second threshold lower than the first threshold, output a second response indicating that the first speaker does not match the pre-stored speaker model and that the electronic device will perform the operation indicated by the request; and
   based on identifying that the score is lower than or equal to the second threshold, output a third response indicating that the first speaker does not match the pre-stored speaker model and that the electronic device will not perform the operation indicated by the request.

2. The electronic device of claim 1, wherein the instructions are configured to cause the at least one processor to update the pre-stored speaker model based on voice data of the received first voice if the first speaker matches the pre-stored speaker model.

3. The electronic device of claim 1, wherein the instructions are configured to cause the at least one processor to select at least one of the first response, the second response, or the third response corresponding to the recognized first voice from among a plurality of pre-stored responses based on the result of the recognition of the first speaker.

4. The electronic device of claim 1, wherein the instructions are configured to cause the at least one processor to generate at least one of the first response, the second response, or the third response corresponding to the recognized first voice by using at least some of a plurality of pre-stored responses based on the result of the recognition of the first speaker.

5. The electronic device of claim 1, wherein the instructions are configured to cause the at least one processor to determine at least one of the first response, the second response, or the third response corresponding to the recognized first voice by performing natural language processing on the recognized first voice.

6. The electronic device of claim 1, wherein the memory stores a plurality of score sections and a plurality of responses of the pre-stored speaker model corresponding to each of the plurality of score sections.

7. The electronic device of claim 1, wherein the instructions are configured to cause the at least one processor to adjust at least one of the first threshold or the second threshold based on the recognized first voice and the calculated score.

8. The electronic device of claim 1, further comprising:
a microphone configured to receive the first voice; and
an output device,
wherein the instructions are configured to cause the at least one processor to output at least one of the first response, the second response, or the third response corresponding to the recognized first voice through the output device.

9. The electronic device of claim 1, further comprising a communication interface,
wherein the instructions are configured to cause the at least one processor to transmit at least one of the first response, the second response, or the third response corresponding to the recognized first voice to another electronic device through the communication interface.

10. The electronic device of claim 1, wherein the instructions are configured to cause the at least one processor to extract a characteristic of the first speaker from the received first voice, determine a speaking style of the first speaker based on the extracted characteristic, and change at least one of the first response, the second response, or the third response corresponding to the first voice in accordance with the determined speaking style.

11. A method of responding to an input voice by an electronic device, the method comprising:
recognizing a received first voice indicating a request for an operation;
recognizing a first speaker based on the recognized first voice;
extracting a characteristic of the first speaker from the received first voice;
calculating a score indicating a similarity between the first speaker and a pre-stored speaker model based on the extracted characteristic and the pre-stored speaker model stored in the memory;
based on identifying that the score is larger than a first threshold, outputting a first response indicating that the first speaker matches the pre-stored speaker model and that the electronic device will perform the operation indicated by the request;
based on identifying that the score is lower than or equal to the first threshold and higher than a second threshold lower than the first threshold, outputting a second response indicating that the first speaker does not match the pre-stored speaker model and that the electronic device will perform the operation indicated by the request; and
based on identifying that the score is lower than or equal to the second threshold, outputting a third response indicating that the first speaker does not match the pre-stored speaker model and that the electronic device will not perform the operation indicated by the request.

12. The method of claim 11, further comprising performing natural language processing on the recognized first voice.

13. The method of claim 11, wherein the electronic device stores a plurality of score sections and a plurality of responses of the pre-stored speaker model corresponding to each of the plurality of score sections.

14. The method of claim 11, further comprising:
receiving the first voice through a microphone of the electronic device; and
outputting at least one of the first response, the second response, or the third response corresponding to the recognized first voice through an output device of the electronic device.

15. The method of claim 11, further comprising transmitting at least one of the first response, the second response, or the third response to the recognized first voice to another electronic device through a communication interface of the electronic device.

16. A non-transitory machine-readable storage medium recording a program to perform a method of responding to an input voice by an electronic device, the method comprising:
recognizing a received first voice indicating a request for an operation;
recognizing a first speaker based on the recognized first voice;
extracting a characteristic of the first speaker from the received first voice;
calculating a score indicating a similarity between the first speaker and a pre-stored speaker model based on the extracted characteristic and the pre-stored speaker model stored in the memory;
based on identifying that the score is larger than a first threshold, outputting a first response indicating that the first speaker matches the pre-stored speaker model and that the electronic device will perform the operation indicated by the request;
based on identifying that the score is lower than or equal to the first threshold and higher than a second threshold lower than the first threshold, outputting a second response indicating that the first speaker does not match the pre-stored speaker model and that the electronic device will perform the operation indicated by the request; and
based on identifying that the score is lower than or equal to the second threshold, outputting a third response indicating that the first speaker does not match the pre-stored speaker model and that the electronic device will not perform the operation indicated by the request.

* * * * *